Sept. 23, 1930.   A. F. SHORE   1,776,398
PHOTOGRAPHIC OBJECTIVE
Filed Feb. 7, 1925    2 Sheets-Sheet 1

|   | Radii | Thickness at center | Diam. | n d | v |
|---|---|---|---|---|---|
| A 1st Lens: | ($r_1 = +1\ 7/32"$)  ($r_2 = +4\ 5/8"$) (Cemented) | .253" | 1 1/4" | Cr.1.617 | 57 |
| B 1st Lens: | ($r_2 = -4\ 5/8"$)  ($r_3 = -1\ 1/4"$) | .047" | 1 1/4" | Fl. 1.54 | 47.7 |
| Separation | .218" | | | | |
| C 2nd Lens: | ($r_4 = -1\ 3/4"$)  ($r_5 = -1\ 3/4"$) (Cemented) | .143" | 1" | Fl. 1.54 | 47.7 |
| D 2nd Lens: | ($r_5 = +1\ 3/4"$)  ($r_6 = +1\ 3/4"$) | .170" | 1" | Cr.1.617 | 57 |

Focal Length 6". Working Aperture F/8.5

Inventor
ALBERT F. SHORE
By his Attorney

Sept. 23, 1930.   A. F. SHORE   1,776,398
PHOTOGRAPHIC OBJECTIVE
Filed Feb. 7, 1925    2 Sheets-Sheet 2

|  | Radii | Thickness at center | Diam. | n d | v |
|---|---|---|---|---|---|
| F 1st Lens: | (r1= +1 7/32") (r2= infinity ) (Cemented) | .253" | 1 1/4" | Cr.1.617 | 57 |
| G 1st Lens: | (r2= infinity ) (r3= −1 1/4" ) | .047" | 1 1/4" | Fl. 1.57 | 41.8 |
| Separation | .218" | | | | |
| H 2nd Lens: | (r4= −1 3/4" ) (r5= −1 3/4" ) (Cemented) | .143" | 1" | Fl. 1.54 | 47.7 |
| I 2nd Lens: | (r5= +1 3/4" ) (r6= +1 3/4" ) | .170" | 1" | Cr.1.617 | 57 |

Focal Length 6". Working Aperture F/8.5

Inventor
ALBERT F. SHORE
By his Attorney

Patented Sept. 23, 1930

1,776,398

UNITED STATES PATENT OFFICE

ALBERT F. SHORE, OF NEW YORK, N. Y.

PHOTOGRAPHIC OBJECTIVE

Application filed February 7, 1925. Serial No. 7,451.

This invention relates to improvements in photographic objectives, particularly to lenses of the type adapted for wide angle view work, and its principal object is to provide a combination which permits a high degree of illumination, combined with a focal definition sharp enough to allow particularly an accurate survey of the objects or view to be photographed and also to obtain the correct focus thereof, and even to permit photographs of fair definition to be made with the diaphragm wide open.

A further object is to provide a simple objective whose lenses or elements have curvatures which are comparatively easily formed and therefore cheaply made.

A further object is to provide a type of objective having an unusually uniformly illuminated field and depth of focus, in the sense that it does not gather all of the chemical rays to an exact or critical focal plane, so that it is especially suitable for amateur or hand cameras.

Another object of the invention is to materially increase the operating speed or size of working aperture in the diaphragm without materially subtracting from its angular spread of view.

Figure 1:
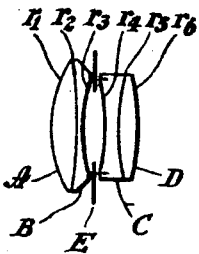
Figure 2:
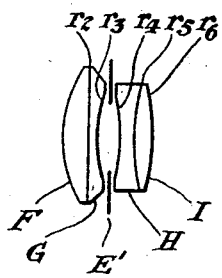

The above mentioned and other features of the invention not hereinbefore referred to will be hereinafter described and claimed and are illustrated in the accompanying drawing, in which Figure 1 is a side elevation (taken from the center) of one embodiment of my improved objective, in which A—B is a cemented meniscus front component, E is a diaphragm, and C—D a cemented meniscus back component; and Fig. 2 is a combination similar in most respects to that of Fig. 1, the principal exception being that the cementing surfaces of F and G are flat, whereas in Fig. 1 the cementing surfaces of A and B are slightly curved away from the diaphragm toward their periphery.

Referring to Fig. 1, the double front convex element A is made of a suitable high crown glass, while the element B is made of a rather low flint glass, the two being cemented together in the usual way. Both the surfaces $r_1$ and $r_3$ may be of the same curvature, although a slightly greater curvature is desirable in $r_1$ than in $r_3$, together with a comparatively flat curve in the cementing surfaces $r_2$. E is the usual diaphragm, while the elements C—D form the back component, in which the radii of $r_4$—$r_5$ and $r_6$ may be substantially the same. In this back component, the element C is made of a rather low flint glass, while the element D is made of a medium high crown glass. The radial curves, thicknesses of the elements and spacing distances as indicated in the drawing and in the following table, furnish an example of objective which at approximately 6" focal length functions properly, although equally favorable results are obtainable by the use of objectives having slight variations of their radial surfaces and their other dimensions, particularly when the refractive and dispersive properties of the glass are varied to meet these changes of form.

| Radii | | Thickness at center | Diam. | $n_D$ | $v$ |
|---|---|---|---|---|---|
| A 1st lens | $\{r_1=+17/32''$ $r_2=+4\%''\}$ | .253'' | 1¼'' | Cr.1.617 | 57 |
| (Cemented) | | | | | |
| B 1st lens | $\{r_2=-4\%''$ $r_3=-1¼''\}$ | .047'' | 1¼'' | Fl.1.54 | 47.7 |
| Separation | .218'' | | | | |
| C 2nd lens | $\{r_4=-1¾''$ $r_5=-1¾''\}$ | .143'' | 1'' | Fl.1.54 | 47.7 |
| (Cemented) | | | | | |
| D 2nd lens | $\{r_5=+1¾''$ $r_6=+1¾''\}$ | .170'' | 1'' | Cr.1.617 | 57 |

Focal length 6''. Working aperture F/8.5.

In the embodiment of the invention shown in Fig. 1 and above described, I have provided a photographic objective embodying a doublet having a normal front cemented positive meniscus A—B whose elements have outer radii approximately 20% of the focal length of the complete assembled objective, and a back cemented positive meniscus C—D whose elements have radii approximately 30% thereof, both being set near together and both being of approximately equal positive power, said front meniscus having a cementing surface for the collecting and dispersing lenses with a radius approximately 3.7 times as great as the outer front surface r', said collecting lens also having a medium high refractive index and said dispersing lens a comparatively low refractive index.

An example of a modification in the radial curvatures and also in the chemical properties in some of the glass to meet such changes in curvature is shown in Fig. 2, in which the elements $r_1$ and $r_3$ of component F—G are of the same curvature as those in Fig. 1, while the curvature of the element $r_2$ is infinity, the latter element being plano. There is also a difference of refractive index in the flint glass element G=1.57 V=41.8. The back component H—I in this instance may be of the same general construction as indicated in C—D Fig. 1, to yield a similar focal length. In this modification of the invention, I have provided a photographic objective, with an unsymmetrical doublet having a normal front cemented positive meniscus F—G having external radii approximately 20% of the focal length of the complete assembled objective, and with a back cemented positive meniscus H—I whose elements have radii approximately 30% thereof, both arranged close together and both being of approximately equal positive power.

Of the two combinations, shown in Figs. 1 and 2, the former is adapted to work at the largest aperture of the diaphragm. By making the component A—B of Fig. 1 and the component F—G of Fig. 2 somewhat thicker, it will not only serve to fully rectify the tendency to corner contraction but the combination will work in the opposite way also.

I claim:

1. In a photographic objective, a doublet having a normal front cemented positive meniscus having external radii approximately 20% of the focal length of the complete assembled objective, and a back cemented positive meniscus whose elements have radii approximately 30% thereof, both arranged close together and both being of approximately equal positive power.

2. In a photographic objective, a doublet having a normal front cemented positive meniscus whose elements have outer radii approximately 20% of the focal length of the complete assembled objective, and a back cemented positive meniscus whose elements have radii approximately 30% thereof, both being set near together and both being of approximately equal positive power, said front meniscus having a cementing surface for the collecting and dispersing lenses with a radius approximately 3.7 times as great as the outer front surface.

3. In a photographic objective, a doublet having a normal front cemented positive meniscus whose elements have outer radii approximately 20% of the focal length of the complete assembled objective, and a back cemented positive meniscus whose elements have radii approximately 30% thereof, both set near together and both being of approximately equal positive power, said front meniscus having a cementing surface for the collecting and dispersing lenses with a radius approximately 3.7 times as great as the outer front surface, said collecting lens also having a medium high refractive index and said dispersing lens a comparatively low refractive index.

4. In a photographic objective, comprising a front meniscus and a back meniscus, an iris diaphragm interposed, both meniscuses having approximately equal positive power on the axis line, the front meniscus having external radii approximately 20% of the combined focal length of the said back and front meniscuses with a cementing surface for the collecting and dispersive elements whose radius is greater than the external front surface thereof, said collecting element having a medium high refractive index and the dispersive element a comparatively low refractive index, and said front meniscus working in conjunction with the back meniscus whose elements have greater external radii but with the cementing surfaces between the dispersive and collecting elements substantially the same.

5. In a photographic objective, comprising a front meniscus and a back meniscus, an iris diaphragm interposed, both meniscuses having approximately equal positive power on the axis line, the front meniscus having external radii approximately 20% of the combined focal length of the said back and front meniscuses, the front meniscus having a cementing surface for the collecting and dispersive elements flatter than the external front surface thereof, said collecting eleelement having a medium high refractive index and the dispersive element a comparatively low refractive index, and said front meniscus working in conjunction with the back meniscus whose elements have greater external radii but with the cementing surfaces betwen the dispersive and collecting elements substantially the same.

In testimony whereof, I affix my signature.

ALBERT F. SHORE.